A. J. KEMPIEN.
TELEPHONE APPARATUS.
APPLICATION FILED MAR. 6, 1909.
1,154,700.
Patented Sept. 28, 1915.
3 SHEETS—SHEET 1.
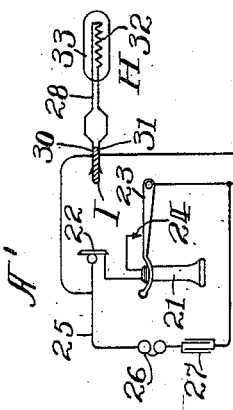
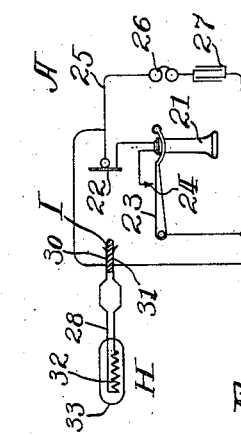
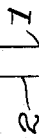
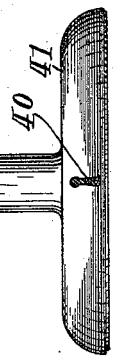
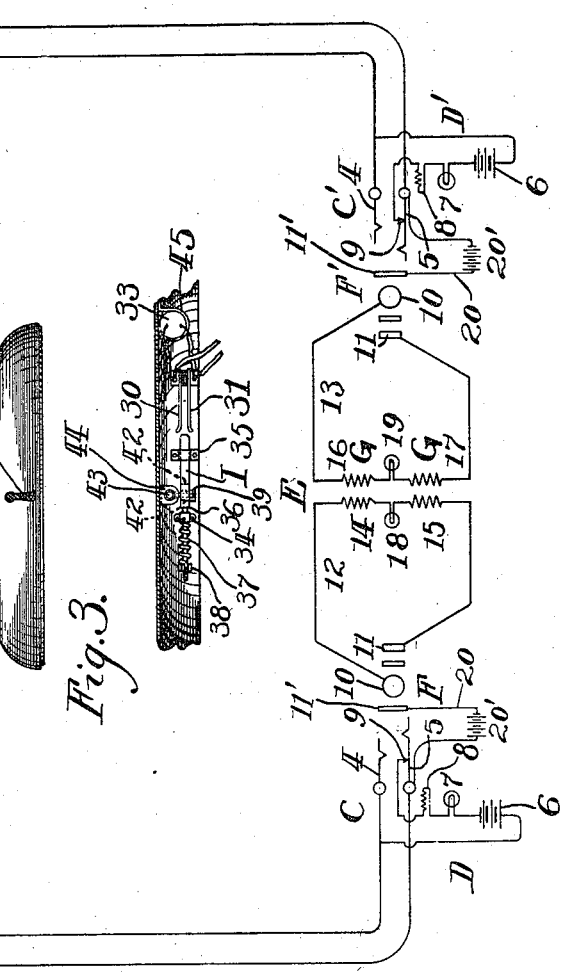
Witnesses:
L. H. Bradbury
Jay I. Durand
Inventor:
August J. Kempien,
By F. S. Bradbury
Attorney

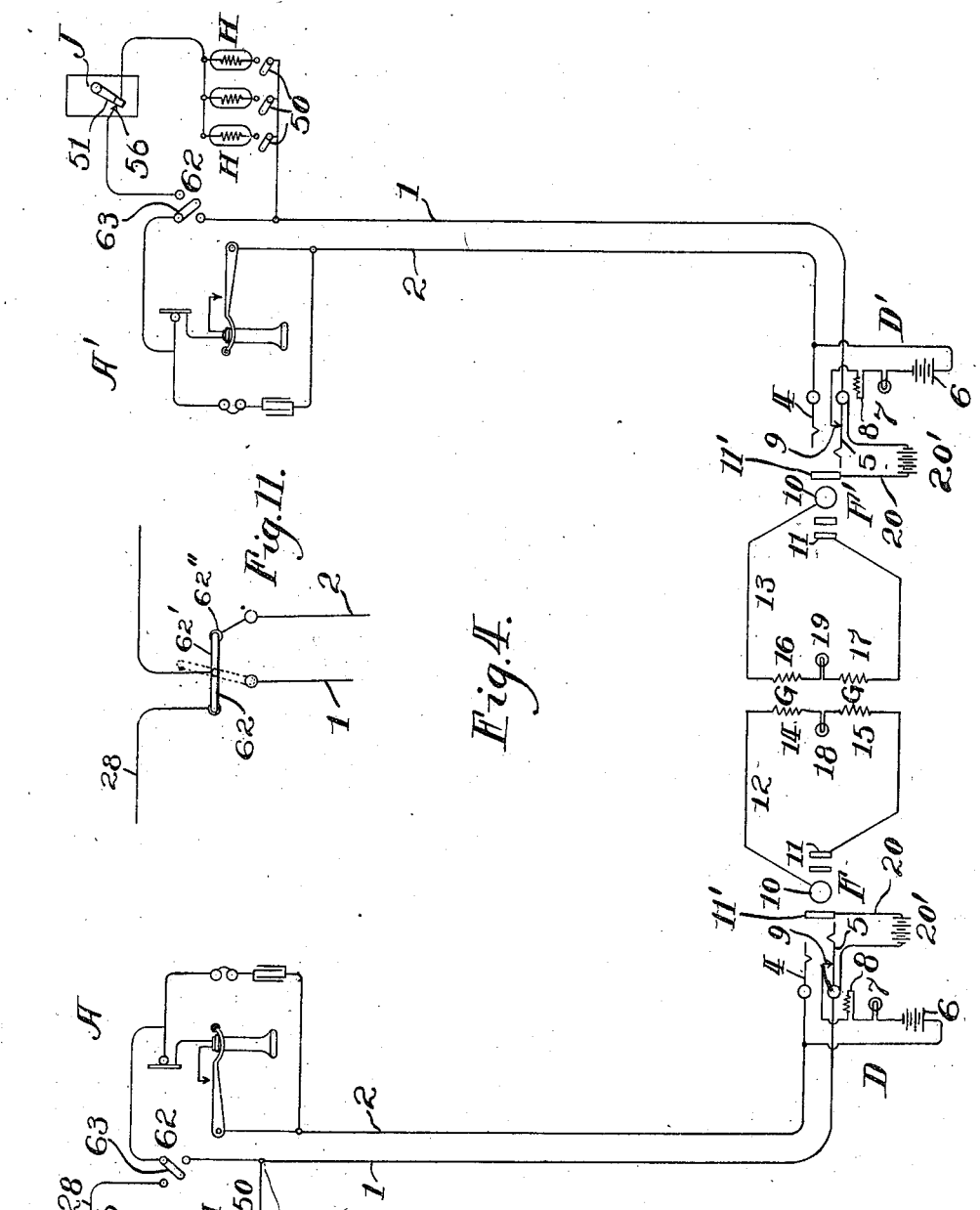

A. J. KEMPIEN.
TELEPHONE APPARATUS.
APPLICATION FILED MAR. 6, 1909.
1,154,700.
Patented Sept. 28, 1915.
3 SHEETS—SHEET 3.
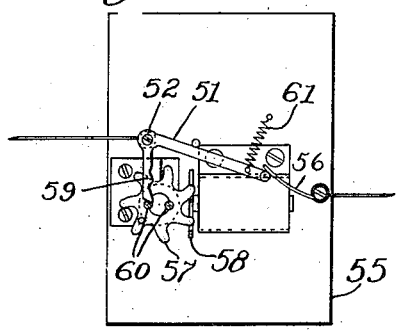
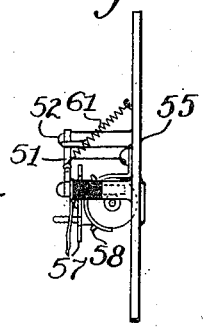
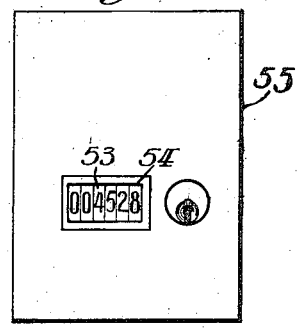
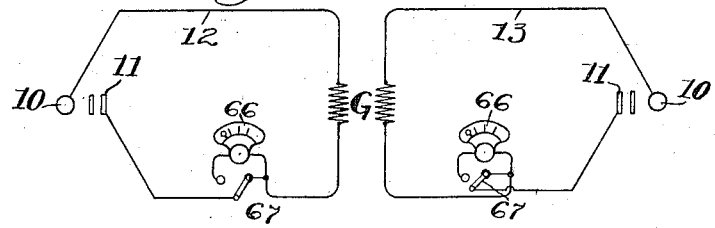
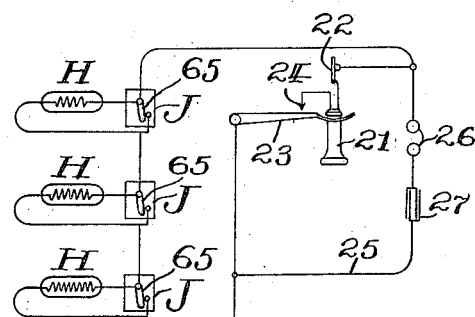
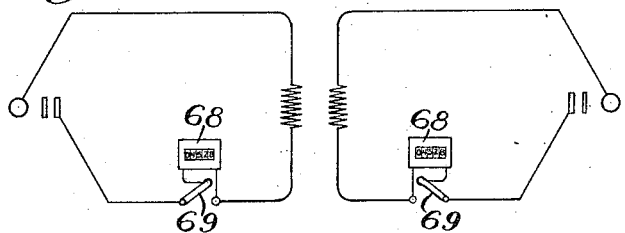
Witnesses:
L. H. Bradbury
Jay S. Wurmund
Inventor:
August J. Kempien
by: L. G. Bradbury
Attorney

UNITED STATES PATENT OFFICE.

AUGUST J. KEMPIEN, OF ST. PAUL, MINNESOTA.

TELEPHONE APPARATUS.

1,154,700.  Specification of Letters Patent.  Patented Sept. 28, 1915.

Application filed March 6, 1909. Serial No. 481,752.

*To all whom it may concern:*

Be it known that I, AUGUST J. KEMPIEN, a citizen of the United States, residing at St. Paul, in the county of Ramsey and State of Minnesota, have invented new and useful Improvements in Telephone Apparatus, of which the following is a specification.

My invention relates to improvements in telephone apparatus the primary object being to provide means in connection with telephone and other electrical circuits for signaling from one place to another.

As applied to telephone circuits, this invention is adapted to prevent the improper use of the telephone instrument in that the operator is signaled in such manner as to indicate that the user has authority to have a connection made.

This improved apparatus provides simple, inexpensive and effective means whereby the calls can be registered as they are made by the subscriber and also means whereby the subscriber's circuit can be automatically balanced in resistance when a signal is sent over the line.

Heretofore the usual methods of preventing unauthorized use of the telephone instrument has been to provide the subscriber with a password or to employ a series of bells or sounders varying in tone which are sounded by dropping a coin against them at the subscriber's instrument, but these methods have been found unreliable, insecure, cumbersone and annoying and many calls and connections have been and are being daily made in exchanges with distant phones requiring toll pay by parties who are unauthorized. These objections are overcome by my invention.

Among further objects of my invention in addition to overcoming the above objections are to provide simple, inexpensive and effective means for operating the telephone apparatus.

This invention is adapted to prevent parties on party lines from transferring toll charges as is now the case, the central operator not knowing which party is calling except by verbal questions and replies. Many toll charges are made by parties who do not pay or forget, the same being charged to a subscriber and eventually becomes a loss to the subscriber or the operating company.

This invention contemplates the use of a branch circuit resistance on coin operated stations, the coin to drop against a bell and at the same time opening the branch circuit and thus cause an indicator or meter to record and indicate. Said meter can be used to keep a daily record of calls and the amount of pay to be received at a subscriber's station. This will guard the company against calls being made and given when the coin is not dropped into the meter.

In the accompanying drawings forming part of this specification Figure 1 is a diagrammatic view of a telephone system employing my invention; Fig. 2 is a detail side view of a telephone stand to which part of my invention is applied; Fig. 3 is a detail sectional view of part of the construction illustrated in Fig. 2 the interior mechanism of the stand being exposed; Fig. 4 is another diagrammatic view of a telephone system illustrating my invention in which several signals can be sent over the line by the subscriber to the central operator and the number of calls registered; Fig. 5 is a detail diagrammatic view of a subscriber's station illustrating mechanism of my invention for sending a plurality of signals over a line, the construction being somewhat modified over that illustrated in Fig. 4; Fig. 6 is a front view of a register for the number of calls sent over the line which is adapted to coöperate with my invention, Figs. 7 and 8 are respectively back and side views of the construction illustrated in Fig. 6; Figs. 9 and 10 are diagrams of modified forms of cord plug circuits, and Fig. 11 is a diagrammatic view illustrating a modified construction of subscribers' branch circuit switch.

In the drawigs A—A' represent the usual substations and 1 and 2 the lines of the subscribers' circuits leading to the central station where they terminate at the springs 4 and 5 of the jacks C—C'. It will be understood that the jacks and apparatus coöperating therewith are similar in construction and that the following description is equally applicable to either one or the other of the subscribers' circuits described. The lines 1 and 2 have connected therewith loops D—D' containing in series the battery 6, line signal lamp 7 and, a suitable fixed resistance 8. This fixed resistance will at times be found superfluous. One side of each loop is connected with the line 2 and the other terminates at a contact point 9 against which the jack spring 5 normally impinges. Associated with the line jacks C—C' is the usual cord plug circuit E of ordinary construction in which is contained the operator's plugs F—F' and repeating coils G—G. The plugs F—F' are respectively connected by their tips 10 and sleeves 11 with loops 12 and 13, the loop 12 containing in series windings 14 and 15 and the loop 13 windings 16 and 17 of the repeating coils G—G. Between the pair of windings 14 and 15 of the loop 12 is inserted a supervisory lamp 18 and between the windings 16 and 17 is inserted a supervisory lamp 19. The tips 10 of the plugs in the supervisory circuit are adapted to be connected with the jack springs 4 of the subscriber's circuit when inserted and the sleeves 11 with the jack rings 11'. The jack ring 11' is tied to the adjacent jack spring 5 by means of the loop 20 in which is a feed battery 20'. The tips 10 and sleeves 11 are adapted to make connection when inserted in the jacks with the jack springs 4 and 5, the springs 5 being lifted off of the contact points 9 and the subscribers' loops D—D' opened.

At each subscriber's station is the usual receiver 21, transmitter 22 and receiver switch supporting arm 23 which are connected in series through the receiver switch contact point 24, when the receiver is off of its support, and which are disconnected when the receiver is hung upon its support. A branch 25 is shunted around said parts in the lines 1 and 2 and contains the usual ringer 26 and condenser 27. The battery feed for the transmitters, it will be noted is obtained in the usual manner.

In order for the subscribers to signal the central operator that they have the right to use the telephones, each subscriber's instrument is provided with a dimming resistance H which is connected in a local loop or branch 28 interposed in series with the line 1. This resistance or local loop is adapted to be cut out or short circuited by means of a movable switch-arm or lock bolt I which slides between a pair of switch springs 30 and 31. As a convenient form of dimming resistance, I have found that fine iron wire 32 in any form such as in a coil as illustrated, inclosed by a sealed chamber 33 from which air has or has not been exhausted as desired, is particularly efficient for this purpose and in addition to being adapted to dim the signal lamps in the subscriber's loop, and supervisory circuit at the central station, it also serves to overcome any inequalities of resistance in the subscriber's line and other parts of the apparatus so that at all times the dimming resistance will act equally upon the signal lamps to cause them to burn dimly in the manner intended. The iron wire dimming resistance has a positive temperature correction thus automatically compensating the resistance of the subscriber's line and dimming the connected resistance lamp.

The dimming resistance while being described as being made out of iron wire, yet it will be understood that said resistance can be made out of copper wire, carbon or any other suitable material for the specific purpose of dimming a signal lamp, impeding or retarding the operation of a signaling device or causing a signal to sub-normally respond as employed in my invention.

The mechanical construction by which my invention can be carried into use can be variously modified to suit the conditions required one way being illustrated in Figs. 2 and 3 of the drawings. In these views the base of an ordinary telephone set or stand is illustrated in which the lock bolt I slides back and forth in two guides 34 and 35 on the side of the shell of the stand. This bolt is adapted to be held normally in forward position between switch springs 30 and 31 by means of the tractile helical spring 37 the ends of which are connected to the support 34 and an adjusting nut 38 on the bolt. The bolt is adapted to be moved back into the retracted position illustrated in Fig. 3 by means of the key 39 which is adapted to be inserted through the keyhole 40 in the casing 41 of the stand into engagement with said bolt between the shoulders 42. The pintle of the key 43 when the key is thrust through the keyhole 40 journals in a lug 44 on the shell to steady the key while it is being turned in engagement with the lock bolt and withdrawing it from between the switch springs 30 and 31 and holding it withdrawn during the transmission of the signal over the subscriber's line. The dimming resistance is shown applied to the stand by means of a loop or band 45 hung from the shell and embracing the inclosing chamber 33 thereof. Thus the subscriber's line circuit remains normally with the dimming resistance cut out and when the receiver is taken down and it is desired to signal the operator that the user has possession of the proper key and is authorized to use the instrument, the key can be inserted upon request of central or otherwise and the bolt withdrawn from between the springs 30 and 31. In this manner the resistance H is thrown into circuit and dims the operator's light either in the subscriber's loop D or in the supervisory circuit according to whether the plug is inserted or not.

In the construction illustrated in Fig. 4 three dimming resistances H—H—H are applied in the dimming resistance loop 28 at each subscriber's station. These dimming resistances are each similar in construction to that illustrated in Fig. 1 except that they vary from each other in resistance, one being of comparatively low resistance, the second a little higher and the third still higher. These resistances are connected in multiple and each one is provided with a switch 50 which can be thrown on or off to operate any one of the resistances or other signaling means and cause the signal lamps to illuminate with proportionate brilliancy. Serially connected in the dimming resistance loop is a meter or recorder J having a switch arm 51 normally closing circuit through the contact piece 56. The meter is of ordinary construction having the numbering digit wheels 53 appearing through an opening 54. A key can be inserted in the meter to revolve the star wheels 57 and 58 and cause the numbers to register every time the key is turned. The switch arm 51 is pivoted at 52 adjoining the star wheels and is provided with a pawl 59 against which the pins 60 on the star wheel 57 are adapted to strike and trip the free end of the switch arm 51 out of contact with the piece 56 each time the star wheel 57 is turned a one half revolution by the key. A spring 61 between the plate 55 and free end of the switch arm tends to hold the switch arm normally closed.

Introduced in the line 1 and connected with the dimming resistance loop 28 is a switch 62 the arm 63 of which can be turned by hand to either throw in or cut out said loop. When the loop 28 is thrown in (see Fig. 4), one of the resistances H can be thrown in by one of the switches 50 to signify for illustration, a 5, 10 or 25 cent toll call according to its dimming effect upon one of the signal lamps visible by the central operator. The subscriber is required to insert a key in the register and operate the meter central noting that the circuit has been made when so operated, so that each class of calls can be recorded. A separate meter J—J—J can be employed for each dimming resistance H—H—H as illustrated in Fig. 5. In this construction the two point switches 65 constructed on and operated by the meters are connected in series in the line 1 and when an indication is to be made a key is inserted in the meter corresponding with the class of toll service desired. The switch on the meter which is operated throws in the dimming resistance loop corresponding while the key is being turned and indicates to central that record has been made of the proper class of call by an authorized person at the subscriber's station. In this manner accurate account can be kept of toll or other calls by the subscriber.

In Fig. 11 the switch 62 for throwing in the branch circuit is provided with an extension 62' which is adapted to make contact with the contact piece 62" when the branch is thrown in. The contact piece 62" being connected with the line 2, cuts out the subscriber's set when the switch 62 is moved into position to throw in the branch 28.

In Fig. 9 the signal is in the form of a graduated meter 66 on the cord plug circuit and influenced by current strength. This meter is adapted to be thrown in or cut out by a switch 67 and will show which resistance has been inserted by the subscriber in the line.

In Fig. 10 the meter is in the form of a number indicator 68 which is connected in the cord plug circuit and will keep account of subscribers' calls by the central operator operating the switch 69.

This invention is applicable for use with coined or automatically operated meters as well as strictly manually operated devices and is subject to various modifications and adapted to various uses. While a signal lamp is employed at the central station by which the effect of the resistances can be observed, other responsive means can be employed within the spirit of my invention.

This invention can be used on a party line to indicate to a central operator which party is calling by placing a modifying resistance at each subscriber's set. When used in this manner each modifying resistance differs from all of the others on a line. When the supervisory connections are made and the lines brought into communication, all dimming resistance loops are cut out and the talking transmission transpires in the usual manner.

In accordance with the patent statutes I have described the principles of operation of my invention together with apparatus which I now consider to represent the best embodiment thereof but I desire to have it understood that the construction shown is only illustrative and that the invention can be carried out by other means and applied to uses other than those above set forth within the scope of the following claims:

Having described my invention, what I claim as new and desire to protect by Letters Patent is:—

1. In combination with a telephone line circuit, a branch in connection with said circuit, a signal in said circuit, and hand operable means auxiliary to the talking and signaling apparatus of said circuit in said branch for operating said signal over said circuit.

2. In combination with a telephone line circuit, a signal connected with said line circuit at the central station, a cord plug circuit adapted to be put into connection with said line circuit, a signal contained in said cord plug circuit and a branch at the subscriber's station adapted to be connected with the line circuit, said branch having an auxiliary device which is hand operable adapted to influence the operation of one of said signals.

3. In combination with a telephone line circuit, a cord plug circuit, a signaling lamp adapted to be connected with said line circuit and cord plug circuit at a central station, dimming resistance adapted to be circuited with said lamp and means for throwing said dimming resistance into or cutting it out of operation, for the purposes specified.

4. In combination with a telephone line circuit, a cord plug circuit, a signaling lamp adapted to be thrown into connection with said circuits at a central station, a branch in the line circuit at a subscriber's station, dimming resistance contained in said branch and means for throwing in or cutting out of operation said dimming resistance, for the purposes specified.

5. In combination with a telephone line circuit, a cord plug circuit, a signaling lamp adapted to be connected with said circuits at a central station, a branch associated with said line circuit at a subscriber's station, a dimming resistance composed of a conductor having a positive temperature correction in said branch and means for throwing in or cutting out of operation said dimming resistance, for the purposes specified.

6. In combination with a telephone line circuit, a cord plug circuit associated with said line circuit at a central station, a signaling lamp adapted to be connected with said circuit at a central station and a circuit at a subscriber's station, whereby said signaling lamp can be modified in brilliancy, for the purposes specified.

7. A source of electrical energy, a main circuit leading therefrom, a branch circuit connected with said main circuit, resistance in said branch circuit, signaling means in said main circuit, and a key operated mechanical lock for throwing in or cutting out said resistance, for the purposes specified.

8. A circuit for conducting pulsatory, undulatory or intermittent electric currents, signaling means arranged in circuit therewith, electrical resistance connected with said circuit, and a key operated mechanical lock for actuating said resistance to operate said signaling means.

9. The combination with the call lines of a telephone transmitter, of signaling means arranged in circuit therewith, a receiver supporting arm, means for actuating said arm to close the circuit when the receiver is removed, a resistance coil, a plunger for throwing said resistance into and out of circuit with said call lines, and a key operated mechanical lock for actuating said plunger.

10. In combination with the call lines of a telephone circuit, signaling means arranged in connection with one end of said call line circuit, a resistance coil, a plunger and a key operated mechanical lock arranged in connection with the opposite end, said key adapted to actuate said plunger so as to throw said resistance into and out of said call line circuit.

11. In combination with a main circuit, a telephone transmitter and receiver, an electric lamp in said circuit, an auxiliary circuit connected with said main circuit, and a mechanically operating removable key for throwing said auxiliary circuit into said main circuit or cutting it out.

12. The combination with a telephone line circuit between the operator's and subscriber's station, electrical resistance at subscriber's station, and a key operated mechanical lock for throwing said resistance into said circuit, for the purposes specified.

13. The combination of a telephone circuit, an electric lamp at the operator's station in said circuit, electrical resistance at a local station connected with said circuit for dimming said lamp, and a mechanically operating key for cutting said resistance out of circuit.

14. In combination with a telephone line circuit, a signaling lamp connected with said circuit at the operator's station, and means independent of the operation of the talking and calling circuits at a local station for impeding the operation of said lamp.

15. In combination with a telephone line circuit, a signal operatively connected with said circuit at the operator's station, and means independent of the operation of the talking and calling circuits at a local station for retarding the operation of said signal from the local station, for the purposes specified.

16. In combination with the call lines of a telephone transmitter and receiver, signaling means arranged in circuit therewith, a receiver supporting arm, means for actuating said arm to close the circuit when the receiver is removed, a resistance coil, and a key operated mechanical lock for throwing said coil in and cutting it out of circuit with said call lines.

17. In combination with the call lines of a telephone circuit, signaling means arranged in connection with one end of said call line circuit, a resistance coil arranged in connection with the opposite end, a plunger, and a key operated mechanical lock for actuating said plunger to throw said coil in and cut it out of said call lines.

18. In combination with the call lines of a telephone transmitter and receiver, a lamp arranged in circuit therewith, a receiver supporting arm, means for actuating said arm to close the circuit when the receiver is removed, resistance arranged in connection with the call lines and a removable key for throwing said resistance in and cutting it out of said lines.

19. In combination with the call lines of a telephone circuit, a lamp arranged in connection with one end of the call line circuit, a resistance coil arranged in connection with the opposite end, and a key operated mechanical lock for throwing said resistance in and cutting it out of said call line circuit.

20. In combination with the call lines of a telephone circuit, a lamp arranged in connection with one end of said call line circuit, a resistance coil, parallel spring arms connecting said coil and the call line circuit, a plunger, and means for carrying said plunger between said arms to short-circuit said coil.

21. The combination with a telephone line circuit between the operator's and subscriber's stations, electrical resistance at the subscriber's station and a key operated mechanical lock for throwing said resistance into said circuit, for the purposes specified.

22. The combination with a telephone line circuit between the operator's and subscriber's stations, a signal operatively connected with said circuit at the operator's station, means at the subscriber's station connected with said circuit for impeding the operation of said signal and a key operated mechanical lock controlling the operation of said means.

23. In combination with an electrical circuit, a branch in multiple with said circuit, and a signal in said circuit at a distance from said branch, whereby it can be determined whether said branch is thrown in said circuit or cut out and a key operated mechanical lock controlling the operation of said signal.

In testimony whereof, I have signed my name to this specification, in the presence of two subscribing witnesses.

AUGUST J. KEMPIEN.

Witnesses:
F. G. BRADBURY,
MORITZ HEIM.

Copies of this patent may be obtained for five cents each, by addressing the "Commissioner of Patents, Washington, D. C."